July 12, 1966 R. B. SALTON 3,260,169
CONVERSION BRAKE CYLINDER
Filed July 15, 1964 2 Sheets-Sheet 1

INVENTOR.
ROBERT B. SALTON
BY
*A. A. Steinmiller*
ATTORNEY

INVENTOR.
ROBERT B. SALTON
BY
ATTORNEY

3,260,169
CONVERSION BRAKE CYLINDER
Robert B. Salton, Monroeville, Pa., assignor to Westinghouse Air Brake Company, Wilmerding, Pa., a corporation of Pennsylvania
Filed July 15, 1964, Ser. No. 382,843
10 Claims. (Cl. 92—59)

This invention relates to brake cylinder devices and, more particularly, to means for readily and inexpensively converting existing large size brake cylinder devices to relatively smaller size brake cylinders suitable for use with molded brake shoes in existing railway braking equipment in place of cast iron brake shoes.

The molded type of brake shoe, as referred to herein, may consist of a composition material that includes, for example, cast iron chips molded with a binding medium comprising rubber and resin. The molded type brake shoes have a much higher coefficient of friction than cast iron brake shoes and retain an almost constant coefficient of friction over a wide range of vehicle wheel speeds thereby requiring a lesser brake shoe applying pressure than for cast iron shoes to effect the same degree of braking on the wheels of a railway car.

Tests conducted with the molded type brake shoes show that, for obtaining substantially corresponding braking effect, approximately one-fourth of the application force is required for the molded type brake shoes as is required for the cast iron type brake shoes commonly used on American railroads at the present time. Such tests indicate that the application force exerted by the present existing brake cylinders and brake rigging is far in excess of that necessary for the molded type of brake shoes. Simply using a lesser degree of fluid pressure or reducing the size of the brake cylinder to reduce the braking force applied to the shoe will introduce complications because of pressure equalization problems incident to the use with existing fluid pressure brake control valve devices.

Moreover, modification or complete replacement of existing brake control equipment in brake rigging on railway cars, to conform to the requirements of the molded type of brake shoe, would be very costly and economically would not warrant the change-over to a molded brake shoe in many instances.

In Patent No. 2,880,043, issued March 31, 1959 to William C. Landis, and assigned to the assignee of this application, there is disclosed and claimed a conventional liner or element for use with existing brake cylinder devices that comprises a cylindrical sleeve in which is slidably mounted a piston smaller in diameter than the original piston used prior to the conversion, the wall thickness of the sleeve being such that the equalizing volume provided in the converted brake cylinder including the annular space between the outside of the sleeve and the inside wall surface of the brake cylinder body is substantially the same as the equalization volume in the existing brake cylinder before the conversion was made. This conversion element is limited to use with brake cylinders that do not require a port in the brake cylinder wall via which to supply fluid under pressure to a slack adjuster device when the piston travel becomes excessive due to wear of the brake shoes.

Accordingly, it is an object of this invention to provide a simple and relatively low cost device for effecting a conversion of existing brake cylinders so as to adapt these existing brake cylinders to deliver the proper amount of applying force to the molded type of brake shoe without interfering with the proper operation of the existing pneumatic brake control equipment presently on the car and which makes provisions for operation of a slack adjusting mechanism when piston travel becomes excessive.

According to the invention, a relatively thin-walled tubular or sleeve-like conversion element is adapted for coaxial mounting within the original brake cylinder body and carries at the pressure head end both an inturned and an outturned flange, and at the non-pressure end an outturned flange. The sleeve-like conversion element also carries intermediate the ends thereof a third flange having a pair of spaced-apart peripheral annular grooves formed therein for receiving a pair of O-rings, each of which forms a seal with the wall of the bore in the brake cylinder body. This third flange is also provided with a port to connect the volume chambers formed on each side of this third flange between the outer periphery of the sleeve-like conversion element and the inside wall surface of the brake cylinder body. The flange at the non-pressure head end of the conversion element is also provided with a peripheral annular groove formed therein for receiving an O-ring which forms a seal with the wall of the bore in the brake cylinder body. The thickness of the sleeve-like conversion element is such that the two constantly connected volumes on the opposite sides of the intermediate flange provide appropriate equalization volume corresponding to the equalization volume of the original cylinder, for the required diameter of piston in the conversion element that will provide the proper force for pressing the molded type of brake shoes against the tread surface of the corresponding wheel.

The pressure head end of the sleeve-like conversion element is supported within the brake cylinder body by a resilient annular bearing ring that is disposed about the periphery of this end of the conversion element and has one side thereof in abutting contact with the outturned flange formed at this end thereof, this outturned flange being provided on its periphery with an arcuate-shaped recess that constitutes a passageway connecting the volume or chamber formed between the pressure head side of a piston slidably mounted in the conversion element and the pressure head to that one of the equalization volumes formed on the pressure head side of the above-mentioned intermediate flange. Thus, with a piston having the required area for providing the essential brake shoe applying force at the equalization pressure between the auxiliary reservoir and the brake cylinder, the provision of the proper equalization volumes between the outside of the sleeve-like conversion element and the inside wall surface of the brake cylinder body makes the use of the conversion element practical for different types and sizes of brake cylinders in accordance with brake applying force requirements since the diameter of the three outturned flanges on the sleeve-like conversion element can be selected to correspond to the inside diameter of the brake cylinder body and the inside diameter of the conversion element selected to correspond to the required diameter of the piston.

The invention further comprises the provision of a radially extending rim or lip formed on that one of the three outturned flanges that is adjacent the non-pressure head, this rim being securely clamped between the end of the brake cylinder body and the non-pressure head secured thereto to rigidly support this end of the conversion element within the brake cylinder body, and secure it against axial movement therein.

The conversion element is provided with one or more radially extending passageways formed in the intermediate one of the three outturned flanges which passageways are disposed between a pair of spaced-apart peripheral annular grooves formed on this flange, via which passageways fluid under pressure may flow from a slack adjuster control port in the wall of the conversion element to a corresponding passageway formed in the brake cylinder body and open at one end at a flat surface formed on the exterior of the brake cylinder body to which a flanged fitting may be secured, this flanged fitting receiving one end of a pipe that at its opposite end is connected to the unual slack adjuster device.

Description

Figure 2:
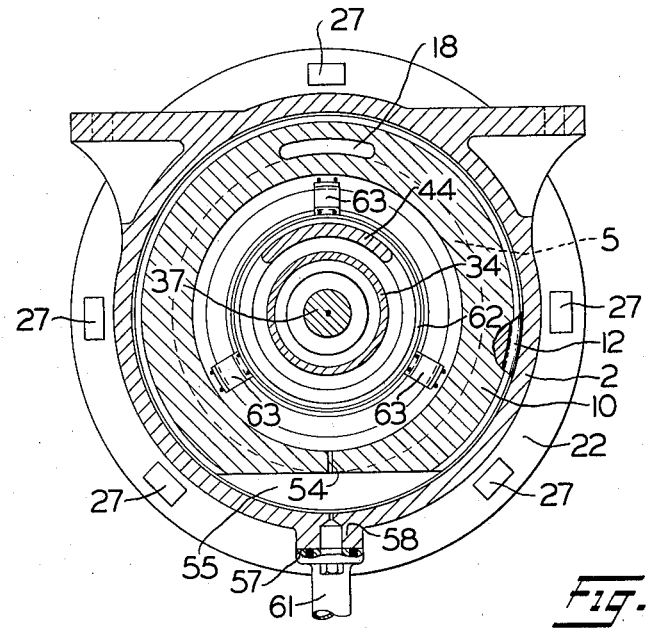
FIG. 2 is a vertical cross-sectional view, taken along the line 2—2 of FIG. 1 and looking in the direction of the arrows, showing further details of the conversion element.
Figure 3:
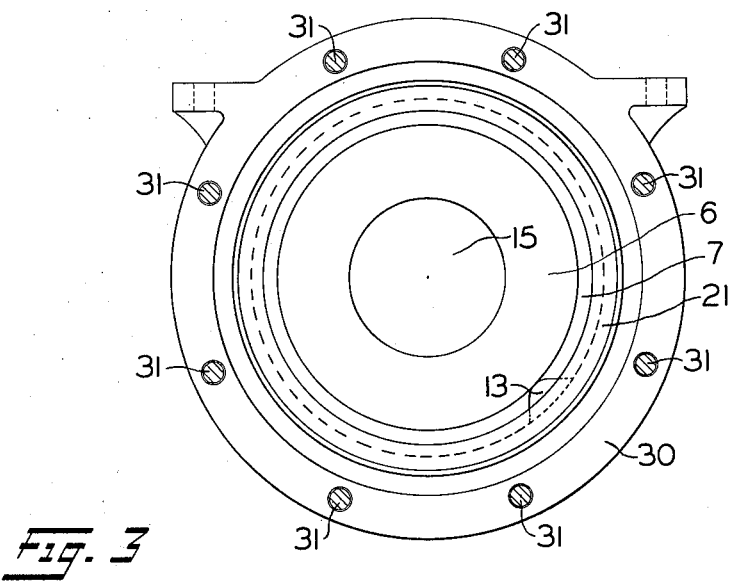
FIG. 3 is an elevational view of the pressure head end of the brake cylinder device with the pressure head removed.

As shown in the drawings, a brake cylinder device embodying the invention comprises the usual pressure head 1 and brake cylinder body 2 but differs from conventional brake cylinders in having a hollow cylindrical conversion element 3 disposed in the usual bore 4 in the brake cylinder body 2. The cylindrical conversion element 3 comprises a sleeve 5 that is provided at its left-hand end with an inturned annular flange 6 and an outturned annular flange 7 and at its right-hand end with an outturned annular flange 8 that is provided on the right-hand side thereof with a radially extending rim or lip 9. Intermediate its ends the sleeve 5 is provided with a third outturned annular flange 10 that is located nearer the flange 8 than the flange 7. The outturned annular flange 10 is provided with two spaced-apart peripheral annular grooves 11 in each of which is disposed an O-ring 12, the outer periphery of each of which cooperates with the wall surface of the bore 4 in the brake cylinder body 2 to form a seal therewith. As shown in FIG. 3 of the drawings, the outturned annular flange 7 is provided with an arcuately shaped port 13 in order that fluid under pressure supplied to a pressure chamber 14 formed between the pressure head 1 and a packing cup 15 secured to a piston 16 may flow to a chamber 17 formed by the cooperative relationship of the outturned annular flanges 7 and 10, the outer periphery of the sleeve 5 and the wall surface of the bore 4 in the brake cylinder body 2. This chamber 17 is connected by a port 18 formed in the outturned annular flange 10, as shown in FIG. 2, to a chamber 19 that is formed by the cooperative relation of the outturned annular flanges 10 and 8, the outer periphery of the sleeve 5, and the wall surface of the bore 4 in the brake cylinder body 2. The volume of the chambers 14, 17 and 19, along with the volume to the left of the piston 16 as the piston 16 moves in the direction of the right hand to its application position, provides a volume in the modified brake cylinder device that is substantially equivalent to the volume of the old brake cylinder device, it being understood that the location of the outturned annular flanges 7 and 8 and the thickness of the wall of the sleeve 5 are so selected that the combined volume of the chambers 14, 17 and 19 is substantially equal to the volume of the old brake cylinder device assuming equivalent normal full piston travel in both instances. By thus retaining substantially the same brake cylinder equalization volume, it is possible to retain on a railway car the same auxiliary reservoir and associated fluid pressure operated devices for effecting the supply of fluid under pressure from the auxiliary reservoir to the modified brake cylinder to obtain the desired reduced braking force on the wheels of the car.

Figure 1:
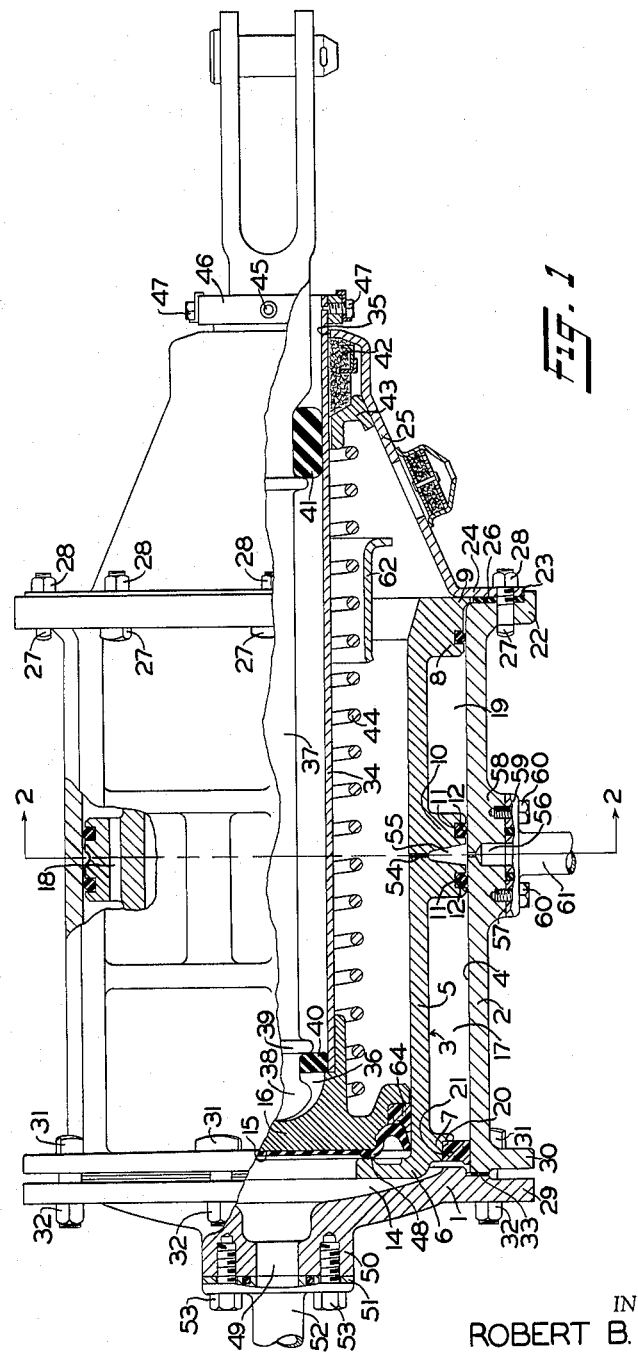
FIG. 1 is an elevational view, partly in section, of a brake cylinder device embodying the novel conversion element of the present invention.

The left-hand side of the outturned annular flange 7 has a cut-back or offset surface 20 machined thereon, as shown in FIG. 1, against which rests one side of a support ring 21 that serves to support this end of the conversion element 3 within the brake cylinder body 2. This support ring 21 may be constructed of a resilient material, preferably a well-known commercially available plastic material.

An annular flange 22 formed on the right-hand end of the brake cylinder body 2 has a cut-back or offset surface 23 machined thereon, as shown in FIG. 1, and between which surface and an annular flange 24 formed on a non-pressure head 25 is disposed an annular seal gasket 26. The annular seal gasket 26 is clamped between the cut-back or offset surface 23 and the flange 24 by a plurality of bolts 27 and nuts 28. The bolts 27 extend through the holes that are presently in the flange 22 formed on the right-hand end of the brake cylinder body 2 and corresponding holes formed in the flange 24 on the left-hand end of the non-pressure head 25. The non-pressure head 25, bolts 27, nuts 28, and gasket 26 may be those previously used, provided that they are not pitted, corroded, rusted or otherwise unfit for use, on the brake cylinder body 2 before the conversion was made. It will also be understood that subsequent to removing the non-pressure head 25 from the right-hand end of the brake cylinder body 2, the sleeve 5, having the flanges 7, 8 and 10 and the support ring 21 encircling the left-hand end of the sleeve 5 and resting against the offset surface 20 on the flange 7, is inserted into the right-hand end of the bore 4 in the brake cylinder body 2 and then pushed into position in which it is shown in FIG. 1 of the drawings after which the rim 9 is tightly clamped between the annular flanges 22 and 24 by the bolts 27 and nuts 28.

The pressure head 1 is provided with an annular flange 29 and the left-hand end of the brake cylinder body 2 is provided with an annular flange 30 each of these flanges being provided with a plurality of arcuately spaced holes for receiving a plurality of bolts 31 and nuts 32 three of which appear in FIG. 1. An annular seal gasket 33 is disposed between the left-hand side of the annular flange 30 and the right-hand side of the annular flange 29, which annular gasket is adapted to form a fluid pressure seal when the nuts 32 are tightened onto the bolts 31. It should be understood that the gasket 33, bolts 31 and nuts 32 may be the same as those used to secure the pressure head 1 to the flange 30 of the body 2 of the brake cylinder device before the conversion was made provided that this gasket and these nuts and bolts are not pitted, corroded, or rusted to such an extent that they are unfit for use.

The piston 16 is slidably mounted in the sleeve 5 and a hollow rod 34, secured coaxially to the piston 16 by means of a plurality of rivets (not shown), extends slidably through a central opening or bore 35 in the non-pressure head 25.

Piston 16 is provided with a recess 36 that is coaxial with the piston. This recess 36 is adapted to receive one end of a push rod 37. The left-hand end of the push rod 37 is provided with a knob 38 having a spherical outer surface that is disposed in the recess 36 in the piston 16 and rests against the left-hand end thereof. Disposed between the knob 38 and a rib 39 formed on the push rod 37 and arranged coaxially about the push rod 37 is an annular cushioning element 40 which is constructed of rubber or some other suitable material. The push rod 37 also carries thereon a push rod sealing ring 41 that is disposed adjacent to the exterior end of the hollow rod 34.

An annular packing seal 42 is disposed about the hollow rod 34 and between the right-hand end of the non-pressure head 25 and a spring seat 43 also disposed about the hollow rod 34. One end of a brake cylinder release spring 44 rests against the spring seat 43 and the opposite end of this spring rests against the right-hand side of the piston 16.

In order that the hollow rod 34 and the push rod 37 move together when the piston 16 is moved to its release position by the release spring 44, the push rod 37 is secured to the hollow rod 34 by a push rod holder pin 45 that extends through two diametrically arranged bores in a collar identified as a push rod holder 46, two corresponding bores in the hollow rod 34, and a corresponding bore in the push rod 37, it being understood that the push rod holder 46 is secured to the hollow rod 34 by a pair of set screws 47 in manner heretofore well-known.

Formed on the packing cup 15 are a plurality of lugs 48 which, when the piston 16 occupies the position in which it is shown in FIG. 1, contact the right-hand side of the inturned annular flange 6 on the left-hand end of the sleeve 5 to form between the pressure head 1 and the piston 16 the pressure chamber 14 to which fluid under pressure may be supplied through a passageway 49 extending through a boss 50 and a flange fitting 51 to which is secured a pipe 52, the flange fitting 51 being secured to the boss 50 by a pair of cap screws 53.

As shown in FIGS. 1 and 2, the outturned annular flange 10 is provided with a passageway 54 the outer end of which opens to a chordal groove 55 of V-shape in cross-section, formed as by machining on the outturned annular flange 10, which groove 55 is midway between the hereinbefore-mentioned peripheral annular grooves 11 formed on this flange. The inner end of the passageway 54 opens into the interior of the sleeve 5. As shown in FIG. 1, the brake cylinder body 2 is provided with a conventional slack adjuster port or passageway 56, it being understood that the location of the outturned annular flange 10 intermediate the ends of the sleeve 5 is such that the passageway 56 and the passageway 54 are coaxial. The lower or outer end of the passageway 56 opens at a flat surface 57 formed on a boss 58 that is integral with the brake cylinder body 2. A flange fitting 59 is secured to the boss 58 by a pair of cap screws 60. The flange fitting 59 receives one end of a pipe 61 that has its other end connected to a slack adjuster device (not shown).

In order to maintain the intermediate portion of the spring 44 in substantial concentric relation with the hollow rod 34 and thus prevent the spring 44 from sagging or buckling into contact with the hollow rod and causing damage thereto, there is provided in conventional manner a sleeve 62 which encircles the spring 44 and which has an inside diameter slightly greater than the outside diameter of the spring to allow free movement of the spring through the sleeve. The sleeve 62 is held in place by three radially arranged metallic strips 63, shown in FIG. 2 of the drawings, one end of each being welded to the sleeve 62 and the opposite end being welded to the interior of the non-pressure head 25.

As shown in FIG. 1 of the drawings, the piston 16 is supported within the sleeve 5 by a bearing or support ring 64 to eliminate wear of the piston 16 in the sleeve 5 as the result of vibration when a railway car is being hauled in a train or as a result of shock to which the brake equipment may be subjected when a brake application is made. The bearing ring or support member 64, like the support 21, may be constructed of a resilient material, preferably a well-known commercially available plastic material.

It will be noted that by providing the existing brake cylinder device installed on the railway car with the cylindrical conversion element 3, a smaller internal diameter of the brake cylinder device is thus obtained and the piston 16 used in the conversion element 3 is accordingly smaller than the piston previously used in the brake cylinder body 2. Thtrefore, the force exerted by the piston 16 on the brake shoe (not shown) as compared to the force exerted by the old type piston is reduced proportionally to the reduction in piston area without substantially reducing the equalizing volume of the brake cylinder device, because, as hereinbefore stated, the volume of the chambers 17 and 19, which are connected by the port 18, along with the volume 14 which is connected to the volume 17 by the arcuate port 13, and the volume to the left of the piston 16 as the piston moves in the direction of the right hand to its application position, provides a volume in the modified brake cylinder device that is substantially equivalent to the volume of the old brake cylinder device, with the consequent equivalent pressure of equalization incidental to a brake application. By thus retaining substantially the same equalization volume, it is possible to retain on the railway car the same auxiliary reservoir and associated fluid pressure operated devices for effecting the supply of fluid under pressure from the auxiliary reservoir to the modified brake cylinder device to obtain the desired reduced braking force for applying the brake shoes to the wheels of the car.

Having now described the invention, what I claim as new and desire to secure by Letters Patent, is:

1. A brake cylinder device comprising:
   (a) a brake cylinder body provided with a bore and a port opening at one end at the wall surface of said bore and at the opposite end to the exterior of the body for connection to an exterior device,
   (b) a pressure head closing one end of said bore and secured to the corresponding end of said brake cylinder body,
   (c) a hollow sleeve, substantially equal in length to said brake cylinder body and having an outside diameter substantially less than that of said bore in said brake cylinder body, coaxially disposed within said bore and in which sleeve a piston is adapted to be slidably disposed, said hollow sleeve comprising:
      (i) a first outturned annular flange formed integral therewith at one end thereof and having an annular radial recess provided on one side thereof, the periphery of said first outturned annular flange being also provided with a port therein the radial depth of which exceeds the radial depth of said recess,
      (ii) a second outturned annular flange formed integral therewith and located thereon so as to be in alignment with the port that opens at the wall surface of said bore in said brake cylinder body, said second outturned annular flange being provided with at least one longitudinal passageway extending therethrough and with a radial passageway opening at one end at the inside wall surface of said hollow sleeve and communicating at the opposite end with said port in said brake cylinder body, and
      (iii) a third outturned annular flange formed integral with said hollow sleeve at the other end thereof, said third outturned annular flange having an outwardly extending annular rim, the diameter of which exceeds the diameter of the bore in said brake cylinder body, which rim abuts the outer face of the other end of said brake cylinder body,
   (d) a support ring disposed in said annular radial recess provided on the one side of said first outturned annular flange for coaxially supporting the one end of said hollow sleeve in the bore in said brake cylinder body, and
   (e) a non-pressure head secured to the other end of said brake cylinder body for rigidly securing said rim on said third outturned annular flange between said other end of said brake cylinder body and said non-pressure head for coaxially supporting the other end of said hollow sleeve in the bore in said brake cylinder body.

2. A brake cylinder device, as claimed in claim 1, further characterized in that sealing means is provided between the inside wall surface of said bore in said brake cylinder body and the periphery of said second and third outturned annular flanges to respectively provide a sealed communication between the radial passageway in said second outturned annular flange and the port in said brake cylinder body, and a sealed chamber formed on the outside of said hollow sleeve between said first outturned annular flange and said third outturned annular flange that is in constant communication with a chamber formed by the cooperative relationship of said pressure head and said piston via said port in said first outturned annular flange and said at least one longitudinal passageway extending through said second outturned annular flange.

3. A brake cylinder device, as claimed in claim 2, further characterized in that said sealing means comprises a plurality of O-rings, at least one of which is disposed on each side of the radial passageway in said second outturned annular flange and the port in said brake cylinder body, and another of which is disposed on the inner side of the outwardly extending rim on said third outturned annular flange.

4. A brake cylinder device, as claimed in claim 2, further characterized in that said second outturned annular flange divides said sealed chamber into two volumes interconnected via said at least one longitudinal passageway therein.

5. A brake cylinder device, as claimed in claim 1, further characterized in that said hollow sleeve is provided with an inturned annular flange at the one end thereof that serves as a brake release position stop for the piston slidably disposed in said hollow sleeve.

6. In a brake cylinder device of the type having a brake cylinder body provided with a piston bore and closed at one end by a pressure head and with a port opening out of said piston bore for connection to an exterior device, a conversion apparatus comprising:
(a) a hollow sleeve, substantially equal in length to the brake cylinder body and having an outside diameter substantially less than that of the piston bore in the brake cylinder body, coaxially disposed in the piston bore, said hollow sleeve comprising:
  (i) an outturned annular flange formed integral with each respective end of said hollow sleeve, one of which flanges is provided on one side thereof with an annular radial recess and the other of which is provided with a peripheral annular groove and a radially extending annular rim to position said sleeve in the bore in the brake cylinder body, and
  (ii) a third outturned annular flange formed integral with said hollow sleeve intermediate the ends thereof and so located thereon so as to be in alignment with the port in the brake cylinder body, said third outturned annular flange being provided with two spaced-apart peripheral annular grooves having therebetween a chordal groove of V-shape in cross-section and a passageway opening at one end at the inside wall surface of said hollow sleeve and at the opposite end to said chordal groove,
(b) a support ring disposed in said annular radial recess in said one outturned annular flange for supporting the corresponding end of said hollow sleeve in one end of the brake cylinder body,
(c) a plurality of O-rings, one disposed in the peripheral annular groove in the other of said two outturned annular flanges and one disposed in each of the two spaced-apart peripheral annular grooves in said third outturned annular flange for respectively forming a seal with the internal wall surface of the piston bore in the brake cylinder body on the inside of said radially extending rim and a seal on the opposite sides of the port in said brake cylinder body, and
(d) a piston slidably mounted in said hollow sleeve and operated responsively to fluid pressure acting thereon in a chamber formed on one side of said piston, said piston being effective when shifted past the opening of said passageway in the wall of said hollow sleeve to establish communication between the chamber and the port in the brake cylinder body via said passageway.

7. In a brake cylinder device of the type having a brake cylinder body provided with a piston bore closed at one end by a pressure head and with a port opening out of said piston bore for connection to an exterior device, a conversion apparatus comprising:
(a) a hollow sleeve, substantially equal in length to said brake cylinder body and having an outside diameter substantially less than that of said piston bore in said brake cylinder body, coaxially disposed within said bore, and in which sleeve a piston is adapted to be slidably disposed, said hollow sleeve comprising:
  (i) an outturned annular flange formed integral with each respective end of said hollow sleeve, one of which flanges is provided on one side thereof with an annular radial recess and the other of which is provided with a peripheral annular groove and a radially extending annular rim to position said sleeve in the bore in the brake cylinder body, and
  (ii) a third outturned annular flange formed integral with said hollow sleeve intermediate the ends thereof and so located thereon so as to be in alignment with the port in the brake cylinder body, said third outturned annular flange being provided with two spaced-apart peripheral annular grooves having therebetween a chordal groove of V-shape in cross-section and a passageway opening at one end at the inside wall surface of said hollow sleeve and at the opposite end to said chordal groove,
(b) a support ring disposed in said annular radial recess in said one outturned annular flange for supporting the corresponding end of said hollow sleeve in one end of the brake cylinder body,
(c) a plurality of O-rings, one disposed in the peripheral annular groove in the other of said two outturned annular flanges and one disposed in each of the two spaced-apart peripheral annular grooves in said third outturned annular flange for respectively forming a seal with the internal wall surface of the brake cylinder body on the inside of said radially extending rim and a seal on the opposite sides of the ports in said brake cylinder body.

8. A conversion apparatus, as claimed in claim 6, further characterized in that the periphery of said one outturned annular flange is provided with a recess the radial depth of which exceeds the radial depth of said annular radial recess on said one side thereof whereby to provide a port, through said one outturned annular flange while said resilient support ring is disposed in said annular radial recess, for communicating fluid pressure from the pressure chamber in the brake cylinder body to the annular chambers surrounding said sleeve.

9. A conversion apparatus, as claimed in claim 6, further characterized in that said third outturned annular flange is provided with a longitudinally extending port therethrough, so disposed as to be in nonintersecting relationship with said grooves thereon, providing communication between the annular chambers surrounding said sleeve at opposite sides of said third flange.

10. A conversion apparatus, as claimed in claim 6, further characterized in that said hollow sleeve is provided with an inturned annular flange effective to act as a piston stop for said piston that is slidably mounted in said hollow sleeve.

References Cited by the Examiner
UNITED STATES PATENTS

| 2,880,043 | 3/1959 | Landis | 92—59 |
|---|---|---|---|
| 3,152,516 | 10/1964 | Allan | 92—59 |

SAMUEL LEVINE, *Primary Examiner.*

I. C. COHEN, *Assistant Examiner.*